April 12, 1938.  H. J. FINDLEY  2,114,050

AUTOMOBILE HEATER

Filed Jan. 12, 1938  2 Sheets-Sheet 1

INVENTOR.
HOWARD J. FINDLEY
BY
ATTORNEYS

April 12, 1938.  H. J. FINDLEY  2,114,050
AUTOMOBILE HEATER
Filed Jan. 12, 1938  2 Sheets-Sheet 2
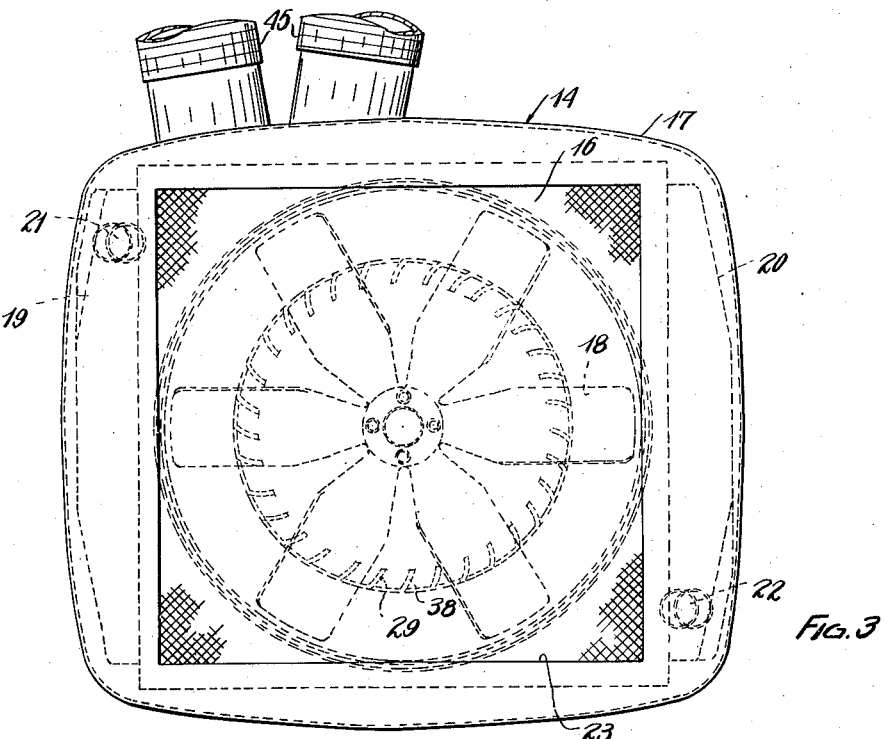
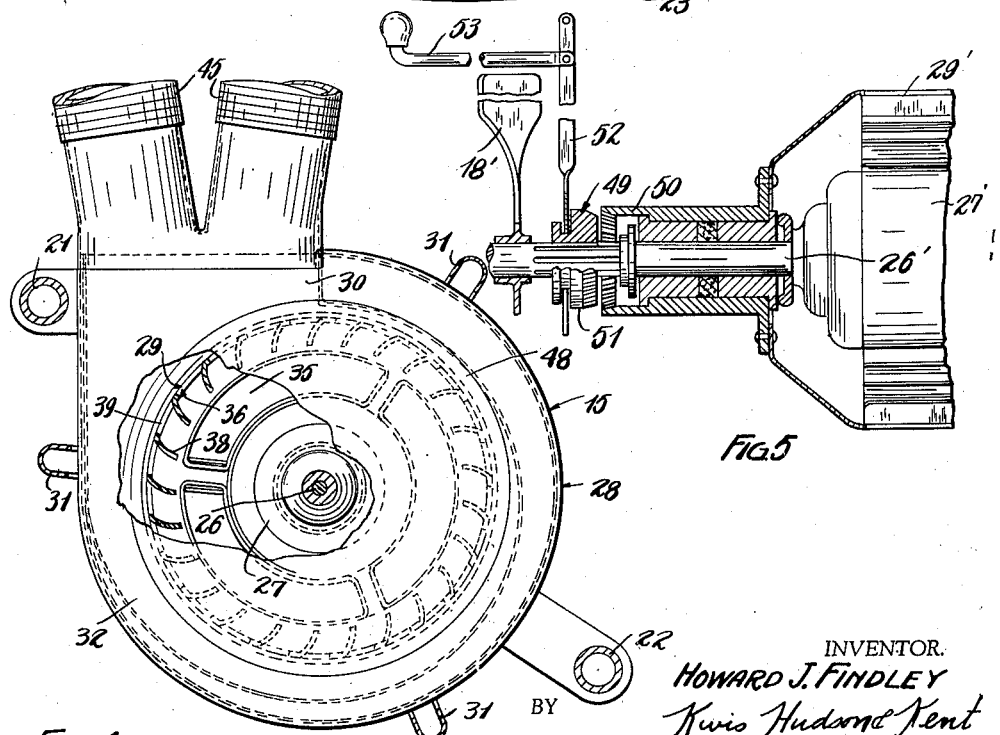

Patented Apr. 12, 1938

2,114,050

UNITED STATES PATENT OFFICE 2,114,050

AUTOMOBILE HEATER

Howard J. Findley, Euclid, Ohio, assignor to Eaton Manufacturing Company, Cleveland, Ohio, a corporation of Ohio Application January 12, 1938, Serial No. 184,627

7 Claims. (Cl. 257—137)

This invention relates to air heaters and, more particularly, to an improved device of this kind which is especially suitable for heating the air of the passenger compartment of an automobile or other motor vehicle.

An object of my invention is to provide an improved air heating device which is operable to deliver a large volume of heated air into a vehicle compartment or to deliver a large volume of air to the windshield of the vehicle, and is adapted to accomplish this purpose with minimum power consumption whereby the device can be operated satisfactorily from the usual storage battery of a motor vehicle.

Another object of my invention is to provide an improved vehicle compartment heater having a core and a plurality of fans, and in which one fan is operable to recirculate air of the compartment and to cause the same to pass through the core and the other fan is operable to recirculate air of the compartment without passage through the core and to deliver such air into a duct leading away from the device for windshield defrosting or other purposes.

A further object of my invention is to provide an improved air heater, of the type having a heat-exchange core, and in which a plurality of reversible fans are selectively operable for causing a flow of air through the core and for delivering a stream of air into a duct leading away from the device for windshield defrosting or other purposes.

Another object of my invention is to provide an improved heater, of the type mentioned, in which a reversible motor serves as a common driving means for the fans, and in which the fans are so constructed that the motor operates with substantially the same power input for both directions of rotation.

Still another object of my invention is to provide an improved automobile heater having a plurality of fans and a core, and in which a reversible motor forming a common drive for the fans operates in one direction to cause a relatively large volume of air to be delivered through the core by one fan and in the other direction to cause a relatively large volume of air to be delivered into a duct leading away from the device for windshield defrosting or other purposes.

Yet another object of my invention is to provide an improved heater, of the type referred to, in which each of the fans operates at its maximum efficiency when rotating in a forward direction and operates at a lower efficiency or, in other words, is partially unloaded when rotating in a backward direction.

Other objects and advantages of my invention will be apparent from the following description when taken in conjunction with the accompanying sheets of drawings in which Fig. 1 is a side elevation, with portions broken away, showing an air heating device constructed according to my invention;

Fig. 3 is a front view of the device;

Fig. 4 is a vertical sectional view taken through the device as indicated by line 4—4 of Fig. 1; and Fig. 5 is a partial longitudinal sectional view taken through a modified form of my air heating device.

Figure 1:
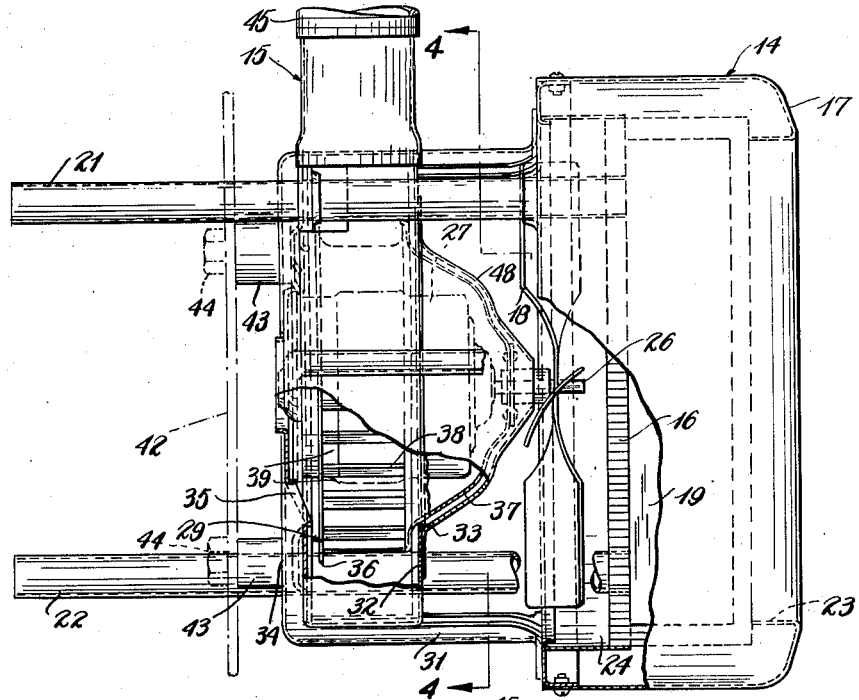
Figure 2:
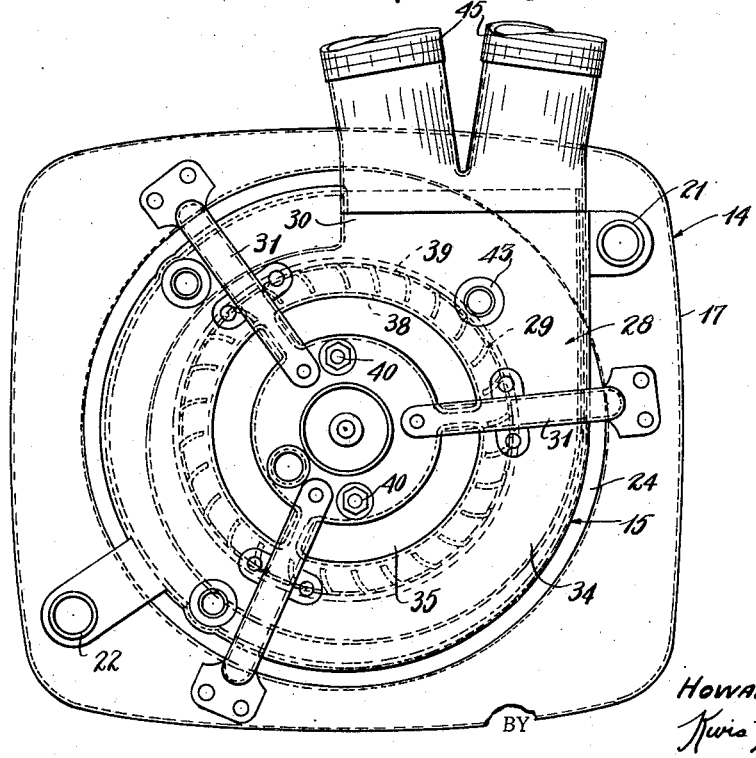
Fig. 2 is a rear view thereof.

More detailed reference will now be made to the accompanying drawings in which I have shown my improved device for heating the air of a vehicle compartment, but before proceeding with the detailed description, it will be understood, of course, that the drawings are to be regarded as being mainly illustrative and that the invention may be embodied in various other devices of this character.

In the form of my improved air heating device shown in Figs. 1 to 4 inclusive, I provide a heat-exchange unit 14 for heating and recirculating the air of a vehicle compartment and a blower unit 15 for delivering air into a duct leading from the device to a point at which the discharge of a stream of air is desired, such as adjacent a windshield to be defrosted.

The heat-exchange unit 14 comprises a core 16 partially surrounded by a shell or housing 17 and a fan 18 which is rotatable adjacent the core for causing a flow of air therethrough. The core 16 may be of a type commonly used in air heating and conditioning apparatus and may have numerous air passages therethrough in heat exchange relation to other passages provided for the circulation of hot water or other conditioning fluid. The core may have tanks 19 and 20 at the ends thereof with which supply and discharge pipes 21 and 22 are connected respectively. The shell 17 may be in the form of a sheet metal housing adapted to be supported by the core and which extends around edge portions thereof providing a front opening 23 of square or other shape and a fan space 24 adjacent the rear face of the core. The fan 18 may be of any appropriate construction, such as the propeller fan shown in this instance, and may be mounted on the shaft 26 of an electric motor 27 which may be suitably supported with its shaft extending toward the core.

The blower unit 15 comprises a housing 28 and a fan or blower 29 which is operable therein. The housing 28 may be constructed of sheet metal or other suitable material, and is of scroll or spiral shape having a tangential discharge opening or spout 30 leading therefrom. The blower housing 28 is spaced rearwardly from the heat exchange unit 14 and may be connected with the latter by a plurality of spaced arms or brackets 31, whereby the heat exchange unit is supported from the blower unit. The front wall of the blower housing 28, that is to say, the side wall 32 thereof which is nearest the heat-exchange unit 14, may have a central opening 33 therein and the rear wall 34 may have a plurality of circumferentially extending air inlet slots 35 formed therein.

The blower 29, which is of the centrifugal type, may be of any appropriate construction but is preferably formed as a sheet metal stamping having an annular outer rim or flange 36 and an axially extending convergently dished body portion 37. The rim portion 36 carries a series of blades 38 and has peripheral openings 39 between the pairs of adjacent blades. The dished body portion 37 may project through the opening 33 of the housing wall 32 and may rotate in this opening with appropriate clearance. The blower 29 is adapted to be driven by the electric motor 27 and, for this purpose, may be provided with appropriate connecting means adjacent the apex of the convergently dished projection 37 for mounting the blower on the motor shaft 26.

The motor 27 which, for an important reason to be presently explained more in detail, is a reversible motor, is disposed in the blower unit 15 and may be mounted on the rear wall 34 of this unit by suitable connecting bolts 40. With the motor mounted in this position it will be seen that the forward end of the motor can extend into the recess of the dished projection 37 of the blower 29.

My improved air heating and conditioning device may be located in any appropriate part of the compartment and may be mounted on any available support, such as the dash 42 of the vehicle. In mounting the device on the dash 42 it is desirable to have the rear wall 34 of the blower unit 15 spaced from the dash, so that air from the vehicle compartment may readily enter the blower housing through the slots 35. This intervening space may be maintained by providing spacers 43 on the blower housing which engage the dash and with which the clamping bolts or screws 44 cooperate.

In the operation of my improved air heating device, the fan 18 of the heat-exchange unit 14 is rotated in a forward direction, that is to say, in a counter-clockwise direction as seen in Fig. 3, to cause a recirculation of the air of the vehicle compartment and to cause a large volume of such recirculated air to pass through the core 16. The out-draft of air thus caused by the fan 18 is heated or conditioned during its passage through the core and is discharged through the front opening 23 into the vehicle compartment. During this out-draft rotation for the fan 18, the blower 29 is also rotating in the same direction but in a direction which is a backward direction for this blower. Such rotation of the blower 29 in a backward direction results in the blower unit 15 being operated at reduced efficiency, or, in other words, in a partially unloaded condition. The operation of the device with the fan 18 rotating in a forward direction and the blower 29 simultaneously rotating in a backward direction is the usual or normal manner of operation during which the heat-exchange unit 14 operates as a recirculating out-draft heater and delivers a large volume of heated air into the vehicle compartment, and the blower unit 15, although operating at reduced efficiency, still delivers a substantial volume of recirculated air into the duct or ducts 45 which connect with the blower discharge and lead to the windshield or other portions of the vehicle compartment.

When conditions are such as to make it desirable to have a larger volume of air discharged from the opening 30 of the blower unit 15 for delivery through duct or ducts 45, the motor 27 is reversed to cause the blower 29 to be driven in its forward direction. The motor may be readily reversed by operation of a suitable reversing switch provided for this purpose in the motor control circuit. When the fan 29 rotates in its forward direction, in other words, in a clockwise direction as seen in Fig. 3, it operates at its maximum efficiency and takes air from the vehicle compartment through the inlet openings 35 and discharges the air into the duct or ducts 45 which lead away from the device for windshield defrosting or other purposes.

During the forward rotation of the defrosting fan or blower 29, the main fan 18 rotates in a clockwise direction as seen in Fig. 3, which is a backward direction for the latter fan. While the fan 18 is running in a backward direction, the heat-exchange unit 14 operates as an in-draft heater causing air from the vehicle compartment to be taken through the front opening 23 and drawn through the core 16. During its backward rotation the fan 18 operates at reduced efficiency, or, in other words, in a partially unloaded condition. Such partial unloading of the fan 18 when operating in a backward direction may be obtained, in part, by designing the fan for the attainment of this result and, in part, from the fact that the air being drawn through the core 16 is warmer and, therefore, rarer than the air which is forced through the core when this fan operates in its forward direction.

In the above example I have referred to the fan 18 as being fully loaded in its forward or out-draft direction of rotation and as being partially unloaded in its backward or in-draft rotation, but obviously the forward or out-draft rotation for this fan may be its partially unloaded condition and its in-draft rotation may be its fully loaded condition. Similarly, the blower unit 15 may be such that the blower 29 rotates under full load when the fan 18 operates at reduced load and as an out-draft fan, and rotates under partial load during the in-draft or full-load rotation of the fan 18.

The operation of the fan 18 at reduced efficiency or in a partially unloaded condition when running in a backward direction, as explained above, and the similar operation of the blower 29 at reduced efficiency or under partial load while running in a backward direction, are desirable effects because they provide for the operation of the motor 27 with substantially the same load and power input for both directions of rotation. In other words, when the motor is running in a direction to drive the fan 18 so that the heat-exchange unit 14 operates as an outdraft heater, the blower 29 is operating under a partially unloaded condition, and, on the other hand, when the motor 27 is reversed and rotates in a direction to cause the blower 29 to run in a forward direction and at full load, the fan 18 is rotating in a backward direction and is operating in a partially unloaded condition. The fan 18 and the blower 29 may be so designed as to pitch and other characteristics as to produce a balanced condition such that the motor may operate at substantially the same power input or load for both directions of rotation, although, if desired, the fans may be so designed that a greater amount of unloading is obtained for one direction of motor rotation than the other.

By providing an air heating device of this type, having a fan for causing a flow of recirculated air through the core and a separate blower for delivering recirculated air into a duct for windshield defrosting or other purposes and driving the fan and blower by a single reversible motor, I obtain the very important advantage that the current consumption for operating the device is always at a minimum and yet a very large volume of air can be delivered from the device either to the vehicle compartment or to the duct for windshield defrosting. In my improved device a motor of relatively small size and of satisfactory power-consumption factor serves to drive the fans 18 and 29, and by reason of the characteristics of the fans and the reversible feature of the motor I am able to obtain a selective operation and a desired proportioning of the air delivery, whereby a larger volume of air can be passed through the heat exchange unit 14 with the simultaneous delivery of a reduced volume of defrosting air or, alternatively, a larger volume of air can be delivered through the duct or ducts 45 for defrosting with the simultaneous passage of a reduced volume through the unit 14.

When the device is operating as an in-draft heater with the fan 18 rotating in a backward direction, the air which is drawn through the core 16 is discharged into the intervening space between the heat-exchange unit 14 and the blower unit 15 and flows out laterally from this space into the vehicle compartment. For deflecting this discharge from the fan 18 in an outward direction, I may provide a deflector member 48 (see Fig. 1) which may be in the form of a convergently dished cover plate mounted on the front wall 32 of the blower housing 28, with the projection 37 of the fan 29 extending into the recess in the reverse side of such cover plate. The deflector member 48 is not necessary to the satisfactory operation of the device, and, if desired, may be omitted, in which case the convex projection of the blower 29 acts as a deflector member for the discharge from the fan 18. I find that the omission of the deflector member 48 will permit a relatively small volume of air to be discharged from the blower housing 28 through the clearance space between the dished projection 37 of the blower and the adjacent edge of the housing opening 33, but such discharge at this point does not materially detract from the satisfactory performance of the device.

Instead of using a reversible motor and operating one fan in a forward direction while the other runs in a backward direction, I may employ a non-reversing motor adapted to drive both fans in a forward direction. When this latter arrangement is desired, I provide a releasable connection between the shaft 26' of the motor 27' and the fan or blower 29', as illustrated in Fig. 5 of the drawings. In this modified arrangement, the fan 18', corresponding with the fan 18 of Fig. 1, is driven continuously in one direction by the motor 27' to cause a flow of air through the core of a heat exchange unit, and the fan or blower 29' is connected with the motor 27' only when its operation is desired for the delivery of air into a duct leading away from the device for windshield defrosting or other purposes.

A releasable connection between the blower 29' and the motor shaft 26' may be obtained in any convenient way, such as by means of the clutch 49 shown in this instance. This clutch may include a hub member 50 connected with the blower 29' and a cone 51 splined to the motor shaft 26' and movable therealong into and out of driving engagement with the hub. A shifter fork 52, having operative engagement with the cone 51, may be arranged to be actuated by a control lever 53 which is located so as to be readily accessible to the driver of the vehicle.

In the form of my invention embodying the non-reversing motor 27' and the clutch 49 for selectively driving the blower 29', it will be seen that an efficiently operating device is provided, because during normally prevailing conditions the motor 27' drives only the fan 18' and the characteristics of the motor and fan can be so selected that the fan will cause a large volume of air to pass through the core of the heat-exchange unit at relatively low current consumption by the motor. On the other hand, when abnormal conditions exist requiring the delivery of air to the windshield by the blower 29' for defrosting purposes, such as when sleet or wet snow is falling, a large volume delivery from the fan 18' is not required. In other words, when the speed of the motor 27' is reduced by reason of the fan 29' being clutched thereto, conditions are usually such that the speed at which the fan 18' is then driven by the motor affords an adequate flow of air through the core of the heat-exchange unit.

From the foregoing description and the accompanying drawings it will now be readily seen that I have provided an improved vehicle heater of simple and economical construction, and that the device embodying my invention will operate to deliver a maximum volume of air with minimum expenditure of electric current for driving the motor. It will be seen furthermore that by providing a plurality of fans and a reversible motor, and arranging the fans so that when one operates in a forward direction the other runs in a backward direction, I am able to secure this desired economy of operation and at the same time provide for the delivery of a large volume of heated air into the vehicle compartment when this is necessary or desirable, or the delivery of a large volume of air to the windshield of the vehicle when required by abnormal driving conditions, such as when sleet or wet snow is falling.

While I have illustrated and described my improved vehicle heating device in a somewhat detailed manner, it should be understood, however, that I do not wish to be limited to the specific details of construction and manner of operation herein disclosed but regard my invention as including such changes and modifications as do not involve a departure from the spirit of the invention and the scope of the appended claims.

Having thus described my invention, I claim:

1. In a device of the character described, a heat-exchange core, a fan adjacent the core operable on forward rotation to force air through the core and on backward rotation to draw air through the core, a second fan operable on forward rotation to discharge a stream of air away from the device and on backward rotation to discharge a reduced stream of air in the same direction, and a reversible motor for driving said fans simultaneously with one fan rotating forwardly and the other rotating backwardly.

2. In a device for heating a motor vehicle compartment, a heat-exchange core, a blower housing spaced from said core, a fan in such space between the blower housing and core and rotatable forwardly to cause a flow of air through the core in one direction and backwardly to cause a flow of air through the core in the opposite direction, a blower operable in said housing in either direction and adapted to discharge a stream of air away from the device, said blower housing being of the scroll type and disposed for the delivery of a maximum volume of air by the blower when said fan is rotating backwardly, and a reversible motor for driving the fan and blower simultaneously with one rotating in a forward direction and the other in a backward direction.

3. In a device of the character described, a heat-exchange core, a fan adjacent the core operable in one direction to force air through the core and in the opposite direction to draw air through the core, a second fan operable in either direction for discharging a stream of air away from the device, and a reversible motor for driving said fans simultaneously with one fan rotating in a forward direction and the other in a backward direction, said fans being so constructed that backward rotation of each causes a partial unloading thereof whereby the motor operates with substantially the same power input for both directions of rotation.

4. In a device for heating a motor vehicle compartment, a heat-exchange core, a blower housing spaced from said core, a fan operable in such space between the blower housing and core for causing a flow of air through the latter, a blower operable in the blower housing and adapted to discharge air into a duct leading away from the device, and a common motor for driving the fan and blower, said motor being disposed in the blower housing substantially centrally thereof and said blower having a convexly dished central portion partially housing the motor and extending toward said fan for deflecting the fan-discharge outwardly with respect to the rotation axis.

5. In a device for heating a motor vehicle compartment, a heat-exchange core, a fan adjacent the core operable in either direction to recirculate air of the vehicle compartment and cause the same to pass through said core, a blower operable in either direction to recirculate air of the vehicle compartment without passing through the core and to discharge the same into a duct leading away from the device, and a reversible motor for driving said fan and blower simultaneously with one rotating in a forward direction and the other in a backward direction, said fan and blower being so designed that when either rotates in a backward direction it is partially unloaded to permit the motor to operate at a speed to cause the delivery of a relatively larger volume of air by the other.

6. In a device of the character described, a heat-exchange core, a fan for causing a flow of air through the core, a blower operable to discharge a stream of air away from the device, and reversible driving means for the fan and blower, said fan and blower being permanently connected with said driving means in reverse relation to each other and with respect to their direction of rotation for maximum air delivery.

7. In a device of the character described, a heat-exchange core, a fan operable to create a flow of air through the core and having a lesser air delivery capacity when rotating at a given speed in one direction than when rotating at the same speed in the other direction, a second fan operable to discharge a stream of air away from the device and arranged to have maximum air delivery capacity when rotating in the direction opposite to that in which the first fan delivers its maximum capacity, and a motor for driving both of said fans, said motor being reversible for changing the direction of rotation of said fans.

HOWARD J. FINDLEY.